United States Patent [19]

Shimazu et al.

[11] Patent Number: 5,850,322
[45] Date of Patent: Dec. 15, 1998

[54] MAGNETIC RECORDING/REPRODUCING DEVICE HAVING HEAD CARRIAGE WITH SHOCK ABSORBER

[75] Inventors: Teruo Shimazu, Atsugi; Toshiharu Shimizu, Machida; Yoshihide Majima, Hatano; Toshimitsu Itoh, Atsugi, all of Japan

[73] Assignee: Mitsumi Electric Co., Ltd., Tokyo, Japan

[21] Appl. No.: 857,780

[22] Filed: May 16, 1997

[30] Foreign Application Priority Data

May 17, 1996 [JP] Japan .................................. 8-123252

[51] Int. Cl.⁶ ...................................................... G11B 5/55
[52] U.S. Cl. .............................................................. 360/106
[58] Field of Search ....................................... 360/106, 109

[56] References Cited

U.S. PATENT DOCUMENTS

| | | | |
|---|---|---|---|
| 4,170,146 | 10/1979 | Owens | 360/106 |
| 4,244,196 | 1/1981 | Staeheli et al. | 464/145 |
| 4,568,310 | 2/1986 | DeMey, II | 464/89 X |
| 5,654,852 | 8/1997 | Kitano et al. | 360/106 |
| 5,682,282 | 10/1997 | Kato | 360/106 |

*Primary Examiner*—John H. Wolff
*Attorney, Agent, or Firm*—Frishauf, Holtz, Goodman, Langer & Chick

[57] ABSTRACT

A flexible disk drive includes a carriage spaced from a main frame and holding a magnetic head, a pair of guide bars for guiding the carriage, rubber dampers fixed on each of the guide bars at both axial end portions thereof, and a linear motor for moving the carriage in a given radial direction of a flexible disk. When the linear motor excessively in the carriage in the given radial direction, the rubber dampers work to stop the carriage in a manner so as to prevent a shock.

2 Claims, 3 Drawing Sheets

MAGNETIC RECORDING/REPRODUCING DEVICE HAVING HEAD CARRIAGE WITH SHOCK ABSORBER

BACKGROUND OF THE INVENTION

The present invention relates to a magnetic recording/reproducing device, such as a flexible disk drive and, in particular, to a shock absorber which is effected upon an excessive movement or displacement of a carriage holding a magnetic head in the magnetic recording/reproducing device.

DESCRIPTION OF THE PRIOR ART

As is well known, a flexible disk drive is a magnetic recording/reproducing device for performing data recording and reproducing relative to a flexible disk inserted therein. In recent years, the flexible disk has been improved to have a greater capacity. For example, a large-capacity flexible disk having a storage capacity of 128 Mbytes has been developed while a normal-capacity flexible disk has a storage capacity of 1 Mbyte to 2 Mbytes. Following this, a flexible disk drive has also been developed which is capable of data recording and reproducing relative to such a large-capacity flexible disk.

Hereinafter, a flexible disk drive capable of data recording and reproducing relative to only the large-capacity flexible disk will be referred to as a high-density dedicated flexible disk drive, while a flexible disk drive capable of data recording and reproducing relative to only the normal-capacity flexible disk will be referred to as a normal-density dedicated flexible disk drive. On the other hand, a flexible disk drive capable of data recording and reproducing relative to both the large-capacity and normal-capacity flexible disks will be referred to as a high-density/normal-density flexible disk drive. Further, if there is no need to distinguish between the high-density dedicated flexible disk drive and the high-density/normal-density flexible disk drive, both will be collectively referred to as a high-density flexible disk drive. One of the differences in mechanism between the normal-density dedicated flexible disk drive and the high-density flexible disk drive resides in the structure of their drive units for moving a carriage holding a magnetic head in a predetermined radial direction with respect to the flexible disk loaded in the disk drive. Specifically, the normal-density dedicated flexible disk drive employs a stepping motor as the drive unit, while the high-density flexible disk drive employs a linear motor, such as a voice coil motor (VCM), as the drive unit.

Hereinbelow, the voice coil motor employed in the high-density flexible disk drive as the drive unit will be briefly explained. The voice coil motor includes a voice coil disposed rearward of the carriage and wound around a drive shaft extending in parallel to the foregoing predetermined radial direction, and a magnetic circuit for producing a magnetic field intersecting the electric current flowing through the voice coil. With this arrangement, when the electric current is caused to flow through the voice coil in a direction intersecting the magnetic field produced by the magnetic circuit, a drive force is generated in an extending direction of the drive shaft based on interaction between the electric current and the magnetic field. This drive force causes the carriage to move in the foregoing predetermined radial direction.

As is well known, the flexible disk includes a magnetic disk medium to be accessed by the magnetic head. On the surface of the magnetic disk medium, a plurality of annular tracks are formed in a radial direction thereof as data recording paths. As appreciated, a track width of the large-capacity flexible disk is set narrower than that of the normal-capacity flexible disk.

When accessing the flexible disk loaded in the flexible disk drive by the magnetic head, it is necessary to position the magnetic head at a desired track position. For achieving this, positioning of the carriage holding the magnetic head is carried out.

In the normal-density dedicated flexible disk drive employing the stepping motor as the drive unit, the positioning of the carriage can be easily achieved since the carriage is moved by the stepping motor per given distance for each of pulses applied to the stepping motor. Accordingly, no dedicated positioning means is required other than the stepping motor.

On the other hand, in the high-density flexible disk drive employing the linear motor as the drive unit, a dedicated positioning means is necessary for positioning the carriage. Specifically, since the linear motor moves the carriage freely in the foregoing predetermined radial direction depending on the electric current flowing through the coil, control is required for stopping the movement of the carriage.

For positioning the carriage, a carriage position detecting device and a carriage position control device are necessary. The carriage position detecting device detects a current position of the carriage, and the carriage position control device controls a position of the carriage based on the detected current position.

As shown in FIG. 3, a conventional carriage position detecting device includes a reflection scale 31' fixed on a main frame (not shown) of the flexible disk drive, and an optical sensor 32' and a reflection mirror 34' arranged on the side of a carriage 15. The optical sensor 32' is provided at a rear portion of the carriage 15 and, although not shown in the figure, includes a light emitting portion composed of a laser diode (LD) and a light receiving portion composed of phototransistors. The light emitted from the light emitting portion advances toward the tip of the carriage 15 and then is reflected by the reflection mirror 34' arranged at a tip portion of the carriage 15 in a perpendicular direction toward the reflection scale 31' arranged on the main frame. The reflection scale 31' includes a reflection plate 311' for reflecting the light received from the reflection mirror 34' again toward the reflection mirror 34', and a scale portion 312' spacing a given distance from the reflection plate 311' toward the carriage 15 and confronting the reflection plate 311'. The scale portion 312' is formed with a plurality of slits 312a' arranged at regular intervals in the foregoing predetermined radial direction for producing positional data of the carriage 15. Specifically, only the light passing the slits 312a' is returned to the optical sensor 32' via the reflection mirror 34' and received by the light receiving portion thereof. Accordingly, by counting the number of light pulses received at the light receiving portion of the optical sensor 32', the position of the carriage 15 can be detected.

However, in the conventional carriage position detecting device as shown in FIG. 3, the optical sensor 32', which is relatively heavy, is mounted on the carriage 15. Thus, the carriage 15 becomes heavy and it becomes more difficult to follow same Further, an adjustment of optical axes between the optical sensor 32' and the reflection mirror 34' is necessary. In addition, since the optical sensor 32' includes the laser diode, it becomes high-priced.

Further, in the high-density flexible disk drive employing the linear motor as the drive unit, it is possible that an excessive movement of the carriage thereby damaging the carriage due to a possible shock applied thereto.

SUMMARY OF THE INVENTION

Therefore, it is an object of the present invention to provide a magnetic recording/reproducing device having a head carriage with a shock absorber mechanism so as to eliminate one or more of the disadvantages inherent in the conventional magnetic recording/reproducing device which includes a the linear motor for driving the carriage.

According to the present invention, there is provided a magnetic recording/reproducing device which comprises a main frame; a disk table rotatably mounted on the main frame for receiving and driving a recording medium thereon; a magnetic head for recording data on and/or reproducing data from the recording medium; a head carriage spaced from the main frame and holding a magnetic head; a pair of guide bars mounted on the main frame and extending in a given radial direction of the recording medium for guiding the carriage; a linear motor for moving the carriage along the guide bars; and a head carriage shock absorber mechanism comprising dampers mounted at both axial end portions of at least one of the guide bars.

It may be arranged that the dampers are provided at both axial end portions of each of the guide bars.

In addition, it may be arranged that each of the dampers comprises a rubber damper having an O-ring structure.

BRIEF DESCRIPTION OF THE DRAWINGS

The present invention will be understood more fully from the detailed description given hereinbelow, taken in conjunction with the accompanying drawings.

In the drawings:

FIGS. 1A–1C are diagrams showing a head carriage with a shock absorber mechanism of a flexible disk drive according to a preferred embodiment of the present invention, wherein FIG. 1A is a plan view, FIG. 1B is a left-side view and FIG. 1C is a rear view;

DESCRIPTION OF THE PREFERRED EMBODIMENT

Now, a preferred embodiment of the present invention will be described in detail hereinbelow with reference to the accompanying drawings.

Figures 1A, 1B:
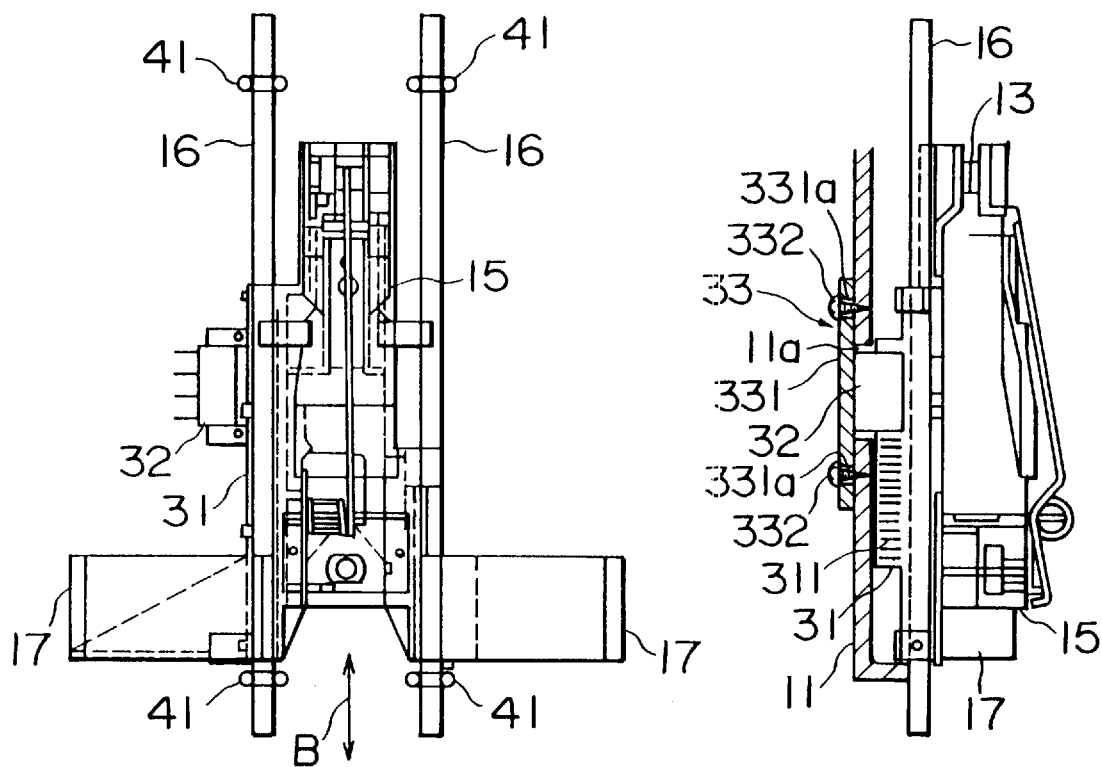
Figure 1C:
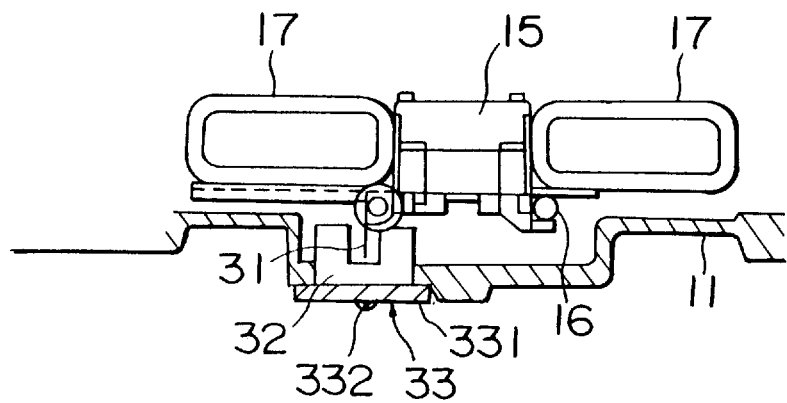
Figure 2:
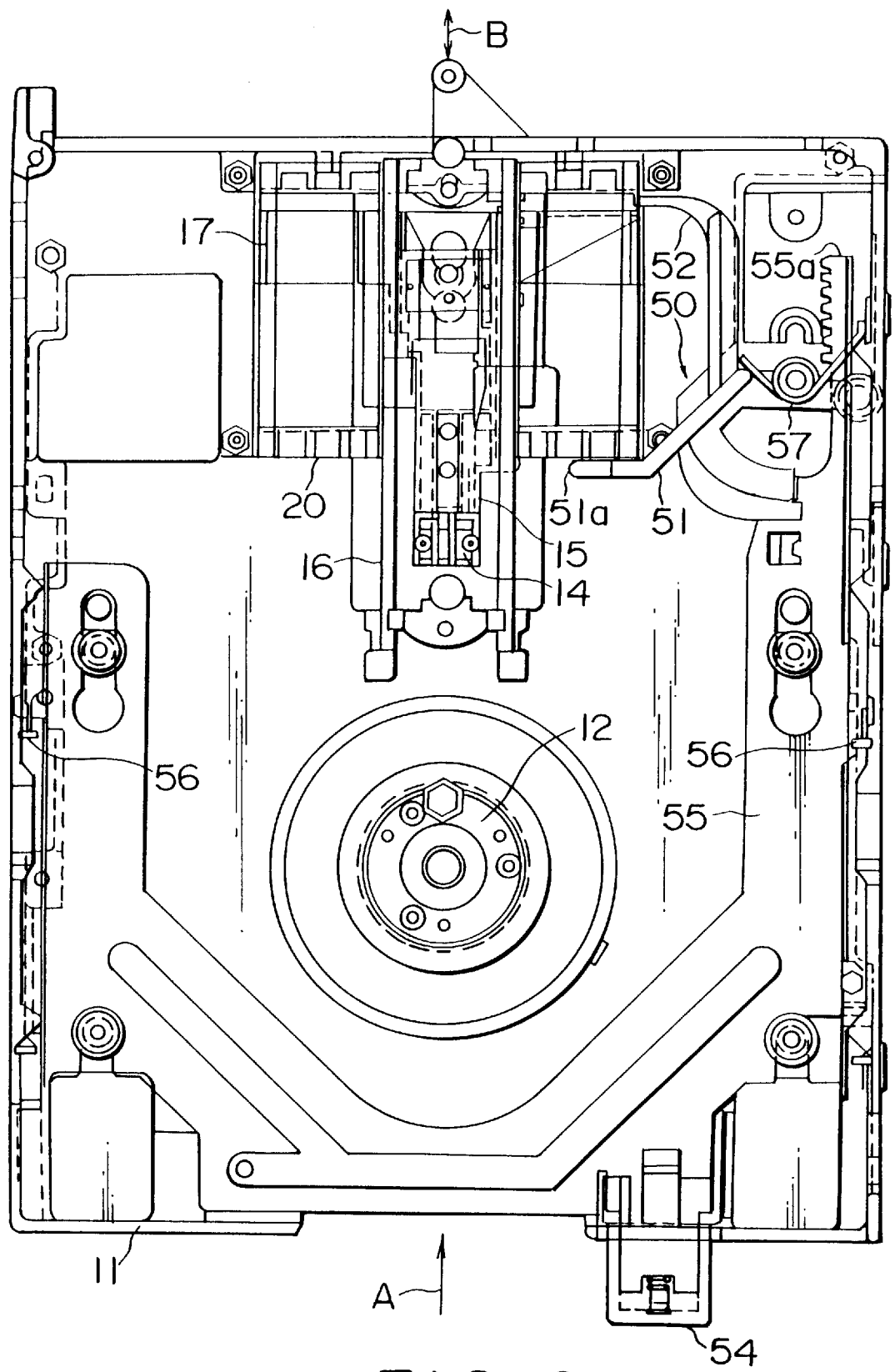
FIG. 2 is a plan view showing the flexible disk drive provided with the carriage shock absorber shown in FIGS. 1A–1C.
Figure 3:
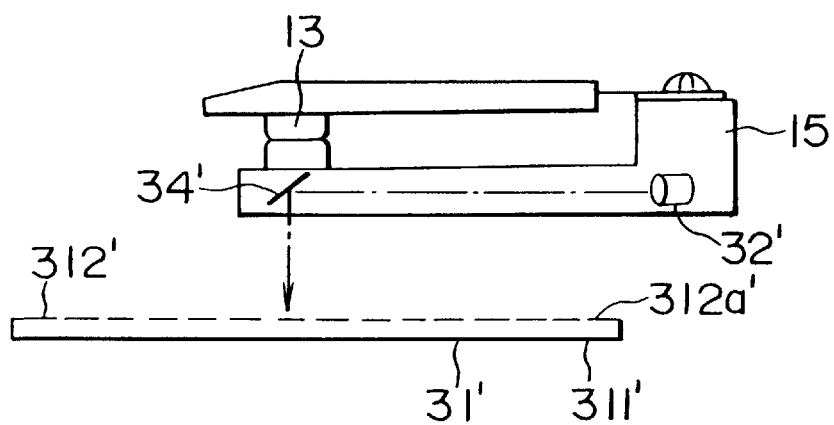
FIG. 3 is a side view schematically showing a conventional carriage position detecting device.

Referring to FIG. 2 together with FIGS. 1A–1C, a flexible disk drive provided with a carriage shock absorber according to the preferred embodiment of the present invention will be described. The shown flexible disk drive (FDD) is a device for performing data recording and reproducing relative to a flexible disk (not shown). The flexible disk is inserted into the flexible disk drive in a direction A in FIG. 2. FIG. 2 shows the state where the flexible disk is loaded in the flexible disk drive.

The loaded flexible disk is held on a disk table assembly 12 with their center axes coinciding with each other. The disk table assembly 12 is rotatably supported on the surface of a main frame 11 of the flexible disk drive. The disk table assembly 12 is rotated by a drive motor (not shown) provided on the underside of the main frame 11 so as to rotate the flexible disk. Further, a board (not shown) mounted with a number of electronic components is attached to the underside of the main frame 11.

The flexible disk drive includes a magnetic head 13 (see FIG. 1B) for carrying out data reading and writing relative to the flexible disk. The magnetic head 13 is held by a carriage 15 via a gimbal 14. A unit comprising the magnetic head 13, the gimbal 14 and the carriage 15 is called a carriage assembly. The carriage 15 is arranged over and spaced from the surface of the main frame 11 and holds the magnetic head 13 to be movable in a predetermined radial direction, as shown by arrows B in FIG. 2, with respect to the flexible disk.

On both sides, the carriage 15 is supported and guided at its lower ends by a pair of guide bars 16 extending in parallel to the predetermined radial direction B.

When driven by a linear motor, the carriage 15 does not always move an adequate distance, that is, it is possible that the carriage 15 moves excessively. For preventing damage of the carriage 15 due to a possible shock applied thereto, a pair of rubber dampers 41, each having an O-ring structure, are fixed on each of the guide bars 16 at both axial end portions thereof. With this arrangement, the pair of the rubber dampers 41 on each guide bar 16 work to stop the excessive movement of the carriage 15 in both directions depicted by the arrows B without causing the shock.

The carriage 15 is driven in the predetermined radial direction B by a voice coil motor. The voice coil motor includes a pair of voice coils 17 disposed rearward of the carriage 15 and each wound around a drive shaft extending in parallel to the foregoing predetermined radial direction B, and magnetic circuits 20 each for producing a magnetic field intersecting the electric current flowing through the corresponding voice coil 17. With this arrangement, when the electric current is caused to flow through each of the voice coils 17 in a direction intersecting the magnetic field produced by the magnetic circuit 20, a drive force is generated in an extending direction of the drive shaft based on interaction between the electric current and the magnetic field. The generated drive forces cause the carriage 15 to move in the foregoing predetermined radial direction B.

The flexible disk drive includes a shutter drive mechanism for opening and closing a shutter (not shown) of the flexible disk, an eject mechanism for ejecting the loaded flexible disk from the flexible disk drive, and a carriage lock mechanism for locking the carriage 15 after ejecting the flexible disk.

A lever unit 50 includes an eject lever 51 and a lock lever 52. The eject lever 51 doubles as an element of the foregoing shutter drive mechanism and an element of the foregoing eject mechanism. The lock lever 52 is arranged near the carriage 15 for locking the carriage 15 upon ejecting the flexible disk.

The eject mechanism includes an eject button 54 protruding from a front bezel (not shown) of the flexible disk drive, an eject plate 55 for positioning the flexible disk inserted via an insertion slot (not shown) of the front bezel such that one side of the flexible disk faces the eject plate 55, and an eject spring 56 having one end engaging with the eject plate 55 and the other end engaging with a disk holder unit (not shown). The eject plate 55 is provided with a rack 55a at its tip in an insertion direction of the flexible disk. The rack 55a meshes with a pinion (not shown) rotatably supported on the surface of the main frame 11. The lever unit 50 is biased by a spring mechanism 57 in a counterclockwise direction.

When the flexible disk is inserted into the flexible disk drive in the direction A in FIG. 2, a tip 51a of the eject lever 51 engages with a right-upper end of the shutter and the lever unit 50 rotates in a clockwise direction following the movement of the flexible disk. Following this, the shutter is caused to slide by the tip 51a of the eject lever 51.

When the flexible disk is fully received in the flexible disk drive, the flexible disk is held in the disk holder unit by a disk lock mechanism (not shown).

FIGS. 1A–1C show, in detail, a carriage position detecting device with the shock absorber mechanism of the flexible disk drive according to the preferred embodiment of the present invention.

The carriage position detecting device includes a scale 31 secured to one side of the carriage 15 confronting the main frame 11, and a photointerrupter 32 mounted on the main frame 11. The scale 31 is formed with slits 311 arranged at regular intervals in the predetermined radial direction B. The photointerrupter 32 includes a light emitting portion (not shown) and a light receiving portion (not shown) confronting each other with the scale 31 interposed therebetween. The light emitting portion is composed of one or a plurality of light emitting diodes, while the light receiving portion is composed of four light receiving elements arranged in the predetermined radial direction B with phase differences of 90°.

As shown in FIG. 1B, the carriage position detecting device further includes an alignment adjust mechanism 33 for carrying out an alignment adjustment by adjusting a position of the photointerrupter 32 in the predetermined radial direction B. The photointerrupter 32 is provided at an opening 11a of the main frame 11. The opening 11a has a size for allowing a positional adjustment of the photointerrupter 32 in the predetermined radial direction B. The alignment adjust mechanism 33 includes a base plate 331 on which the photointerrupter 32 is fixedly mounted, and at least two screws 332 for fixing the base plate 331 to the main frame 11. The base plate 331 is formed with at least two elongate holes 331a extending in the predetermined radial direction B. The base plate 331 is fixed to the main frame 11 by the screws 332 received through the corresponding elongate holes 331a. With the thus structured alignment adjust mechanism 33, the positional adjustment of the photointerrupter 32 in the predetermined radial direction B can be achieved.

In the carriage position detecting device having the foregoing structure, the light emitted from the light emitting portion of the photointerrupter 32 is received at the light receiving portion of the photointerrupter 32 via the slits 311 of the scale 31. Accordingly, by counting the number of the lights received at the light receiving portion, a current position of the carriage 15 can be detected.

As described above, according to the foregoing preferred embodiment of the present invention, the scale 31, which is lightweight, is mounted on the side of the carriage 15 as opposed to the prior art where the relatively heavy optical sensor 32' is mounted on the side of the carriage 15. Thus, the carriage 15 can be reduced in weight to improve the followability thereof. Further, as opposed to the prior art, the adjustment of the optical axes between the optical sensor 32' and the reflection mirror 34' is not necessary, but only the positional adjustment of the photointerrupter 32 in the predetermined radial direction B is required. Further, the optical sensor 32' including the high-priced laser diode is not used, but the photointerrupter 32 including the low-priced light emitting diode is used, thereby leading to reduction in cost.

Further, since the rubber dampers 41 are provided on the guide bars 16 at their both axial end portions, when the carriage 15 moves excessively by the linear motor, the damage of the carriage 15 due to a possible shock applied thereto can be prevented.

While the present invention has been described in terms of the preferred embodiment, the invention is not to be limited thereto, but can be embodied in various ways without departing from the principle of the invention as defined in the appended claims. For example, the present invention is applicable not only to the high-density flexible disk drive, but also to a magnetic recording/reproducing device where a carriage is driven by a linear motor.

What is claimed is:

1. A magnetic recording/reproducing device comprising:

a main frame;

a disk table rotatably mounted on said main frame for receiving and driving a recording medium thereon;

a magnetic head for recording data on and/or reproducing data from said recording medium which is received and driven on said disk table;

a linearly driven head carriage spaced from said main frame and holding said magnetic head;

a pair of guide bars mounted on said main frame for guiding said linearly driven head carriage, said pair of guide bars extending in a radial direction with respect to said recording medium which is received and driven on said disk table; and a head carriage shock absorber comprising a plurality of rubber dampers each having an O-ring structure, said rubber dampers being respectively mounted at both axial end portions of each of said guide bars.

2. A carriage shock absorber for a magnetic recording/reproducing device, said magnetic recording/reproducing device including a linearly driven carriage spaced from a main frame and holding a magnetic head, and said carriage shock absorber comprising:

a pair of guide bars for guiding said carriage in a radial direction with respect to a recording medium; and a plurality of rubber dampers each having an O-ring structure, said rubber dampers being respectively provided at both axial end portions of each of said guide bars.

* * * * *